(12) United States Patent
Vanzante

(10) Patent No.: US 7,424,626 B2
(45) Date of Patent: Sep. 9, 2008

(54) LAPTOP COMPUTER RECHARGING USING ETHERNET CONNECTION

(75) Inventor: Craig Alan Vanzante, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 402 days.

(21) Appl. No.: 10/833,603

(22) Filed: Apr. 28, 2004

(65) Prior Publication Data

US 2005/0246557 A1 Nov. 3, 2005

(51) Int. Cl.
*G06F 1/26* (2006.01)

(52) U.S. Cl. .................. 713/300; 713/340

(58) Field of Classification Search .......... 713/300, 713/310, 340
See application file for complete search history.

(56) References Cited

U.S. PATENT DOCUMENTS

| 6,445,376 | B2 | 9/2002 | Parrish | |
|---|---|---|---|---|
| 6,535,983 | B1 | 3/2003 | McCormack et al. | |
| 6,668,296 | B1 * | 12/2003 | Dougherty et al. | 710/303 |
| 6,912,145 | B2 * | 6/2005 | Hung et al. | 363/125 |
| 6,928,568 | B2 * | 8/2005 | Breen et al. | 713/340 |
| 2003/0061522 | A1 * | 3/2003 | Ke et al. | 713/300 |
| 2004/0203555 | A1 * | 10/2004 | Kao | 455/402 |
| 2004/0232768 | A1 * | 11/2004 | Hung et al. | 307/3 |
| 2005/0136989 | A1 * | 6/2005 | Dove | 455/572 |

\* cited by examiner

*Primary Examiner*—Rehana Perveen
*Assistant Examiner*—Paul B Yanchus, III

(57) ABSTRACT

One embodiment disclosed relates to a laptop computer system including a display casing, having display circuitry and a display screen, and a main computer casing coupled to the display casing. The main computer casing includes a battery power source, a charging regulator, and an Ethernet-type connector. The battery power source is coupled to a motherboard switching regulator. The charging regulator is coupled to the battery power source and configured to recharge the battery power source. The Ethernet-type connector coupled to the charging regulator and configured to provide power thereto.

11 Claims, 7 Drawing Sheets

LAPTOP COMPUTER RECHARGING USING ETHERNET CONNECTION

BACKGROUND OF THE INVENTION

1. Field of the Invention

The present invention relates generally to computers and more particularly to charging batteries of laptop computers.

2. Description of the Background Art

Computer systems come in many shapes, sizes and computational ability. For persons who work in designated locations, a standard desktop computer may be sufficient to fulfill that person's needs. However, for a user who travels frequently and needs computing power in those travels, a portable or laptop computer is desirable.

Laptop computers are characterized in that the entire computing functionality is incorporated into a single package. That is, the motherboard, hard drive, disk drives, CD ROM drives, keyboard and display are all packaged in a compact device typically weighing less than ten pounds. Laptop computers are fully functional in that they may execute the very same programs, for example word processors and spreadsheet programs, as full sized or desktop computers. Laptop computers have a battery that allows for remote operation of the laptop even in locations where alternating current (AC) wall socket power is not available.

While laptop computers may address portable computing needs, they are not without their limitations. For example, the keyboards of most laptop computers are a non-standard size. That is, the keys may be slightly closer together and not as ergonomically placed as a standard keyboard. A further limitation of laptops, given the relatively small size, is they only have a limited number of communication ports available. Also, the display devices for laptop computers are typically small, as compared to desktop monitors, to keep the overall size of the laptop computer small.

Of particular relevance to this disclosure, a laptop computer can only operate for a limited time using battery power. This is because a laptop computer's microprocessor, display screen, and other components require significant power to run, and the laptop battery can only hold a limited amount of power. In order to counteract the limited operating time using battery power, many users carry a second charged-up battery. Many users also carry around a somewhat cumbersome AC-to-DC power converter along with the laptop so as to be able to plug into a conventional power socket when available.

SUMMARY

One embodiment disclosed relates to a laptop computer system including a display casing, having display circuitry and a display screen, and a main computer casing coupled to the display casing. The main computer casing includes a battery power source, a charging regulator, and an Ethernet-type connector. The battery power source is coupled to a motherboard switching regulator. The charging regulator is coupled to the battery power source and configured to recharge the battery power source. The Ethernet-type connector coupled to the charging regulator and configured to provide power thereto.

Another embodiment disclosed relates a portable computer system including at least a battery power source, a charging regulator, a first Ethernet-type connector, and a second Ethernet-type connector. The battery power source is coupled to a motherboard switching regulator, and the charging regulator coupled to the battery power source and configured to recharge the battery power source. The first Ethernet-type connector coupled to the charging regulator and configured to provide power thereto. The second Ethernet-type connector is also coupled to the charging regulator and configured to provide power thereto.

Another embodiment disclosed relates to a method of extending an operating time of a battery-powered notebook computer. An Ethernet-type connector of the notebook computer is coupled to a network port that provides power. Power is received from the network port and is stepped-down from a higher voltage level to a lower voltage level. The power at the lower voltage level is provided to a charging regulator. The power provided from the network port is insufficient for full operation of the notebook computer and so is used to extend the operating time of the notebook computer running on battery power.

DETAILED DESCRIPTION

Figure 1:
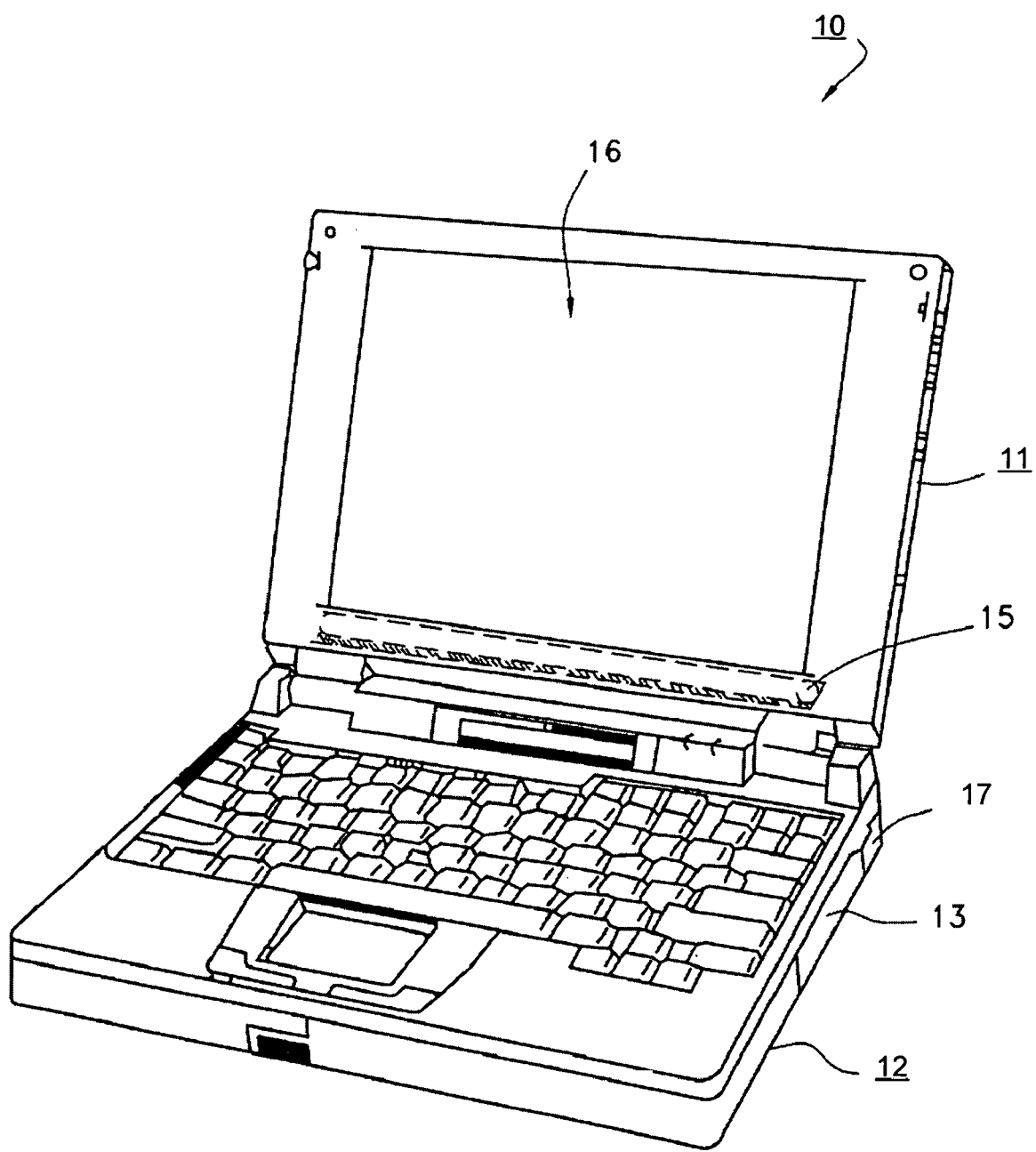
FIG. 1 is a perspective view of a notebook or laptop computer in accordance with an embodiment of the invention.

FIG. 1 is a perspective view of a notebook or laptop computer 10 in accordance with an embodiment of the invention. The laptop computer 10 includes a display panel 11 and a chassis 12. The chassis 12 includes a rechargeable battery 13. The display panel 11 includes a display screen 16 of some type, such as an LCD display screen, and also has mounted therein a light source 15 for delivering light as is known in the art. The chassis 12 also includes an Ethernet-type connector or jack 17. The Ethernet-type connector 17 is shown located at one side of the chassis 12, but the connector may be located at the opposite side or at the back of the chassis 12 (or at other locations of the laptop computer 10) in alternate embodiments. The Ethernet-type connector 17 is the port into which one end of an Ethernet cable 18 (shown in FIG. 2) is inserted. The Ethernet cable 18 connects the laptop computer 10 to a network 19 (shown in FIG. 2) of computer systems and/or other networkable devices. There is also a conventional power connector 21 (shown in FIG. 2) typically located on the back edge of the chassis 12.

Figure 2:
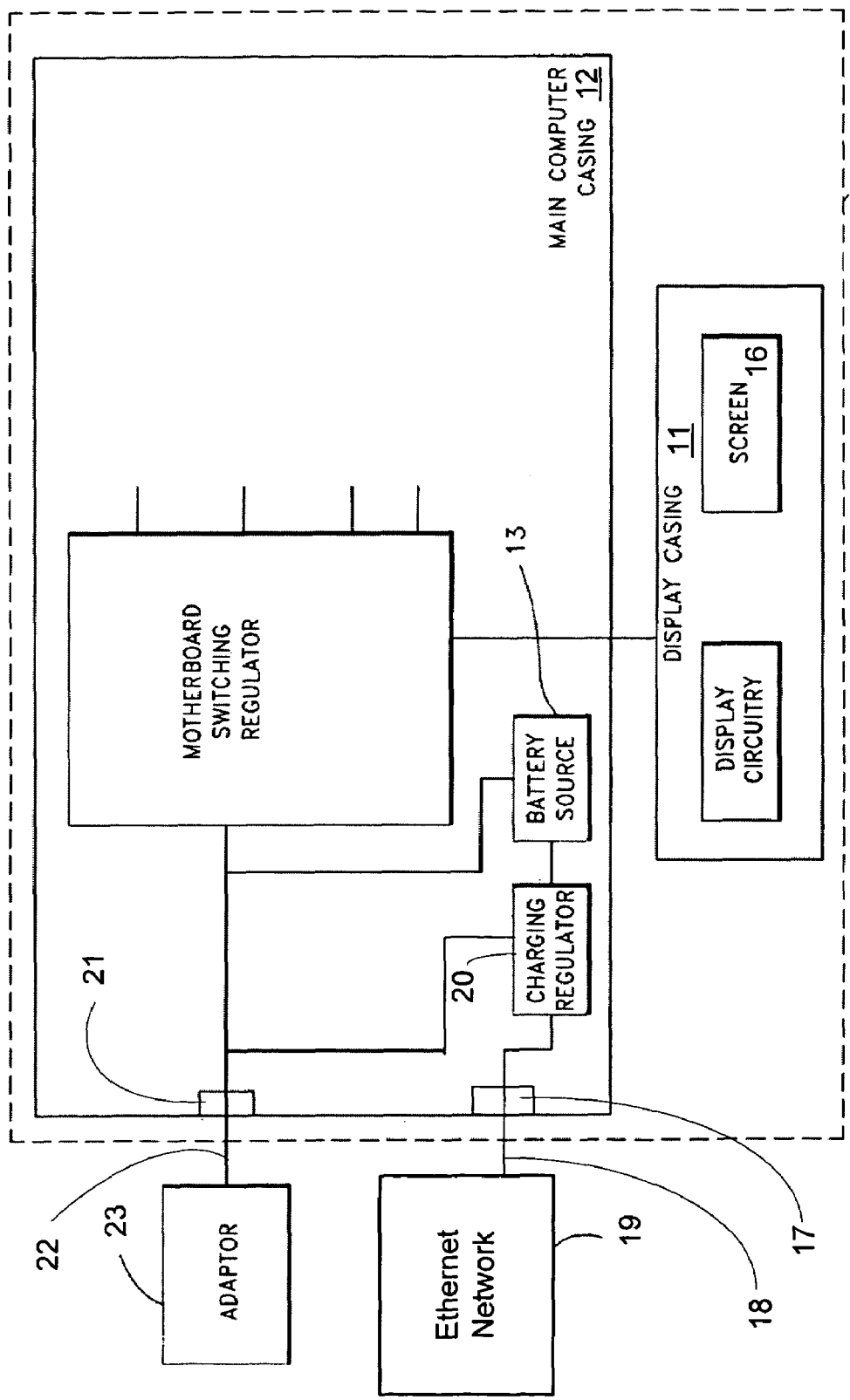
FIG. 2 is a block diagram of the electrical power system of the laptop computer of FIG. 1 in accordance with an embodiment of the present invention.

FIG. 2 is a block diagram of the electrical power system of the laptop computer 10 of FIG. 1 in accordance with an embodiment of the present invention. As shown, the computer 10 (which typically includes a microprocessor as CPU, associated chipset, display screen, and other logic) is capable of receiving power from multiple sources.

The notebook computer 10 is configured to be connected (via a conventional power connector 21 and a conventional cable 22) to a conventional power adaptor 23. The power adaptor 23 is connected to and receives power from a conventional external power source (for example, a wall socket). The power adaptor 23 performs any power conversions that may be necessary (for example, going from 110 volts AC to 15 volts DC), and the motherboard switching regulator of the computer 10 is then supplied powered by this external source. At the same time, the rechargeable battery 13 may also be recharged (if necessary) by the external power source (via the charging regulator circuit 20). And when the external power source is not available, the computer 10 is powered by the rechargeable battery 13.

In accordance with an embodiment of the present invention, the laptop computer 10 is further configured to receive power from the Ethernet network 19 by way of the Ethernet-type connector 17 and the Ethernet cable 18. In this case, the Ethernet cable 18 includes, in addition to data communications related lines, a pair of lines delivering electrical power. In one specific embodiment, a spare pair of lines (not used for data transmission by 10 Base-T or 100 Base-T Ethernet) in the Ethernet cable 18 is utilized to transmit the power. In another specific embodiment, a pair of the data lines are used to transmit the power (for example, at 50 volts DC), in addition to or instead of transmitting data. The power received from the network 19 may be used to recharge the battery 13.

Figure 3:
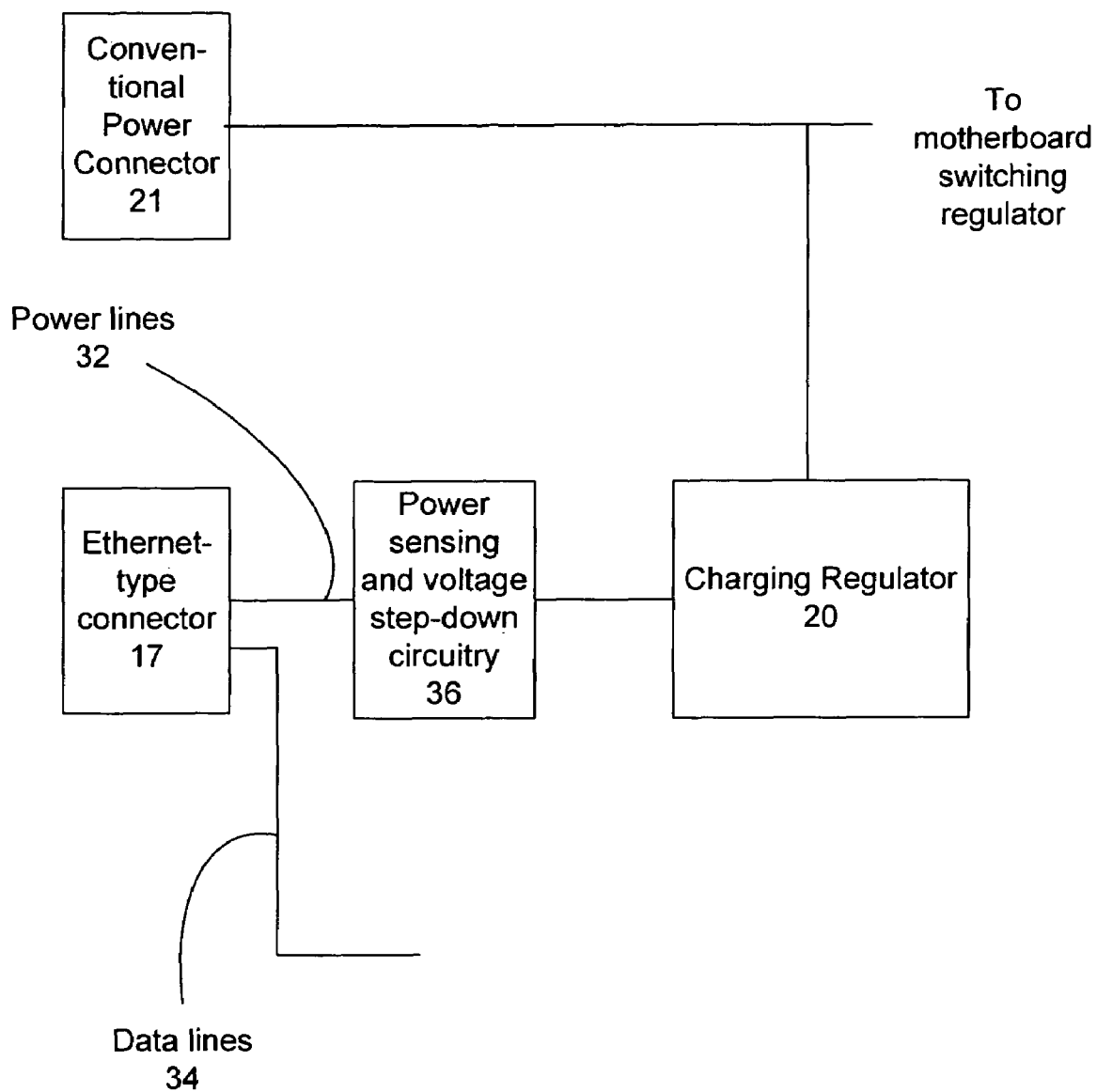
FIG. 3 depicts a portion of the electrical power system of FIG. 2 in greater detail in accordance with an embodiment of the present invention.

FIG. 3 depicts a portion of the electrical power system of FIG. 2 in greater detail in accordance with an embodiment of the present invention. As depicted in FIG. 3, the Ethernet connector 17 may be configured to connect to both power lines 32 and data lines 34 within the notebook computer 10. In a particular embodiment, the power lines 32 connect to the battery charging regulator 20 by way of power sensing and voltage step-down circuitry 36. The power sensing circuitry is configured to sense whether or not the Ethernet connection provides power (in addition to or instead of data communications). If the power sensing circuitry determines power is not being provided, then the power lines may be kept disconnected from the charging regulator 20. The voltage step-down circuitry is configured to reduce the higher voltage level (for example, 50 volts) supplied by the Ethernet connection to a lower voltage level (for example, 15 volts) for the input to the charging regulator 20. Depending on the particular implementation, the power sensing and/or voltage step-down circuitry may be optional.

Figure 4:
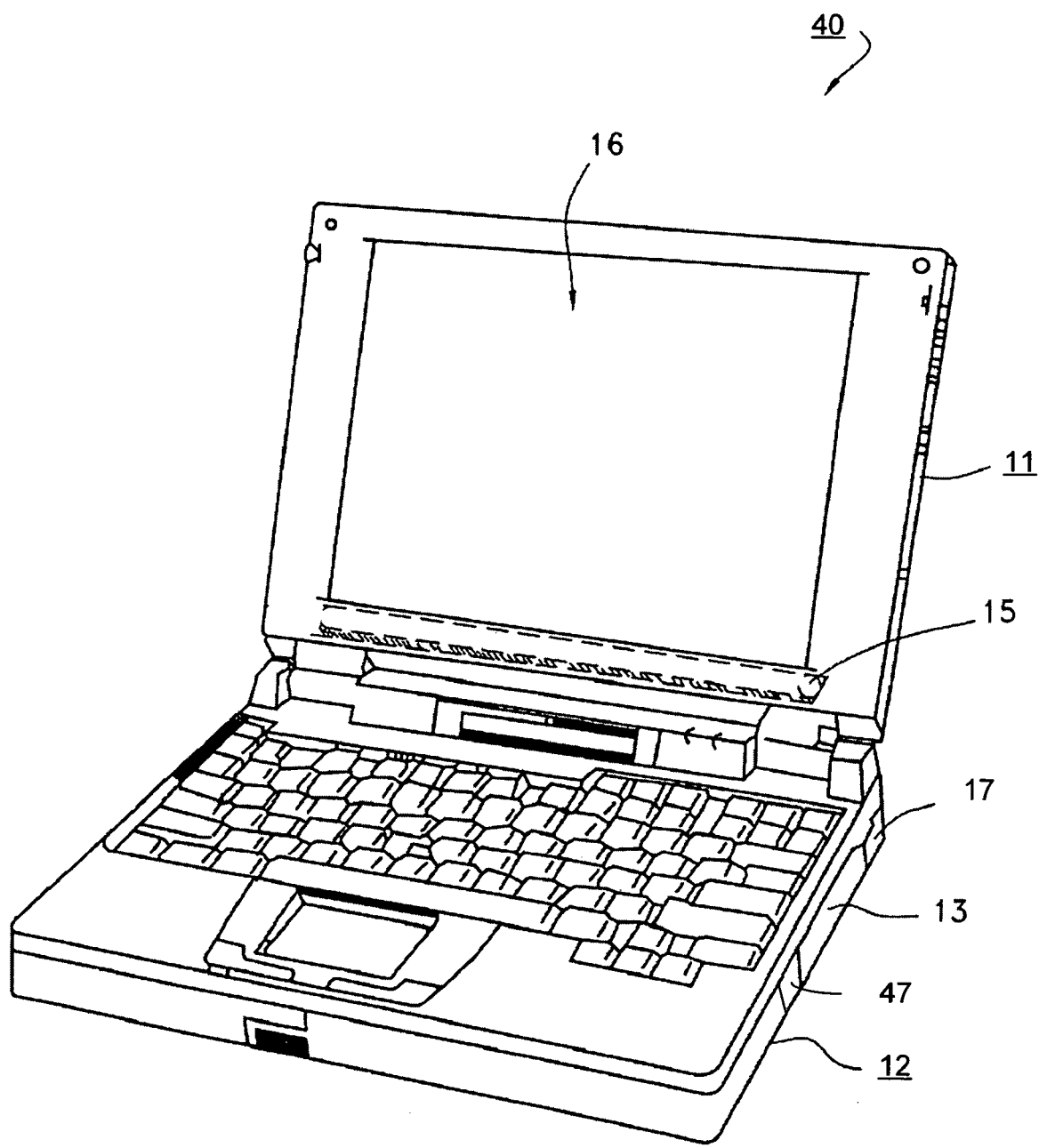
FIG. 4 is a perspective view of a notebook or laptop computer in accordance with another embodiment of the invention.

FIG. 4 is a perspective view of a notebook or laptop computer 40 in accordance with another embodiment of the invention. The laptop computer 40 includes a display panel 11 and a chassis 12. The chassis 12 includes a rechargeable battery 13. The display panel 11 includes a display screen 16 of some type, such as an LCD display screen, and also has mounted therein a light source 15 for delivering light as is known in the art. The chassis 12 also includes a first Ethernet-type connector or jack 17 and a second Ethernet-type connector or jack 47. Both Ethernet-type connectors 17 and 47 are shown located at one side of the chassis 12, but these connectors 17 and 47 may be located at the opposite side or at the back of the chassis 12 (or at other locations of the laptop computer 10) in alternate embodiments. In accordance with an embodiment on the invention, while the first Ethernet connector 17 is designated for networking and/or power, the second Ethernet connector 47 is designated for power only.

The first Ethernet-type connector 17 is the port into which one end of a first Ethernet cable 18 (shown in FIG. 5) is inserted. This first Ethernet cable 18 connects the laptop computer 10 to a network 19 (shown in FIG. 5) of computer systems and/or other networkable devices. The network 19 may or may not be configured to supply power (for example, at 50 volts DC).

The second Ethernet-type connector 47 is the port into which one end of a second Ethernet cable 48 (shown in FIG. 5) is inserted. This second Ethernet cable 48 may connect the laptop computer 10 to a power adaptor (sometimes called a power "brick" because of its shape) 49. This power adaptor 49 is specially configured with an Ethernet-compatible output so as to be able to deliver power (for example, at 15 volts DC) via the Ethernet cable 48. The other end (not illustrated) of the power adaptor 49 may be connected to and receives power from a conventional external power source (for example, a wall socket supplying 110 volts AC).

Alternatively, this second Ethernet cable 48 may connect the laptop computer 10 to an Ethernet network that supplies supplemental power (for example, at 50 volts DC). The Ethernet network may be the same as the network 19 connected to the first connector 17 or it may be a different network.

Figure 5:
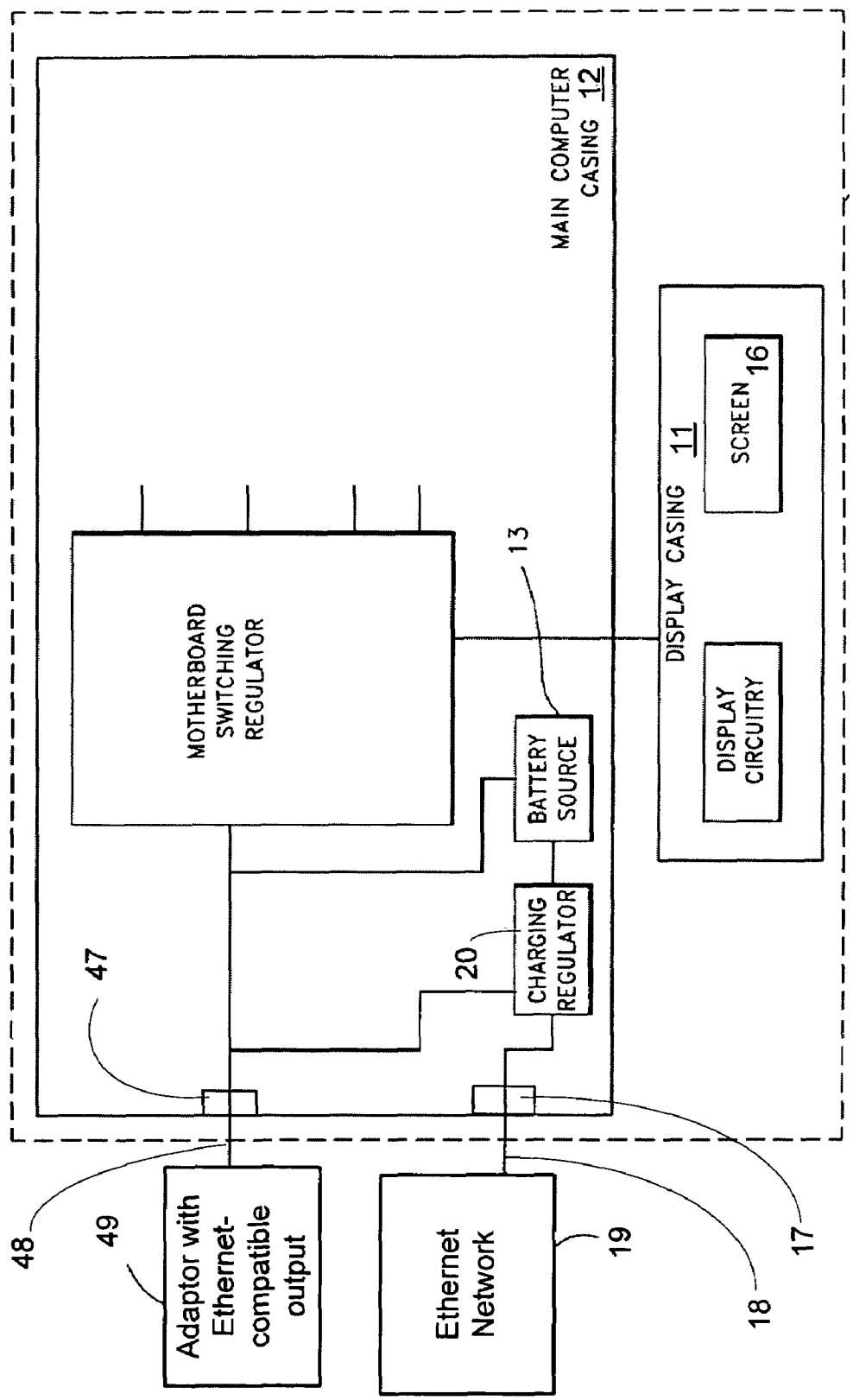
FIG. 5 is a block diagram of the electrical power system of the laptop computer of FIG. 4 in accordance with an embodiment of the present invention.

FIG. 5 is a block diagram of the electrical power system of the laptop computer 40 of FIG. 4 in accordance with an embodiment of the present invention. As shown, the computer 40 (which typically includes a microprocessor as CPU, associated chipset, display screen, and other logic) is capable of receiving power from multiple sources.

In accordance with an embodiment of the present invention, the laptop computer 40 is configured to receive power from an Ethernet network 19 by way of the first Ethernet-type connector 17 and Ethernet cable 18. In this case, the first Ethernet cable 18 includes, in addition to data communications related lines, a pair of lines delivering electrical power. In one specific embodiment, a spare pair of lines (not used for data transmission by 10 Base-T or 100 Base-T Ethernet) in the Ethernet cable 18 is utilized to transmit the power. In another specific embodiment, a pair of the data lines are used to transmit the power (in addition to transmitting data). The power received from the network 19 may be used to recharge the battery 13.

In accordance with an embodiment of the present invention, the notebook computer 40 is further configured to be connected (via the second Ethernet-type connector 47 and Ethernet cable 48) to a special power adaptor 49 that is configured with an Ethernet-compatible output. The special power adaptor 49 is connected to and receives power from a conventional external power source (for example, a wall socket) and outputs converted power via the Ethernet-compatible output. The power adaptor 49 performs any power conversions that may be necessary (for example, going from 110 volts AC to 15 volts DC, or going from 110 volts AC to 50 volts DC), and the computer 40 is then powered by this external source. At the same time, the rechargeable battery 13 may also be recharged (if necessary) by the external power source (via the charging regulator circuit 20).

In accordance with one embodiment, if power via such an adaptor 49 is not available (for example, a user did not bring the adaptor 49 or a wall socket is not available), then the user may alternatively connect the second Ethernet connector 47 to receive supplemental power (for example, at 50 volts DC) from an Ethernet network (either the same network 19 as connected to the first connector 17 or a different network). The supplemental power may be used to recharge the battery 13.

Figure 6:
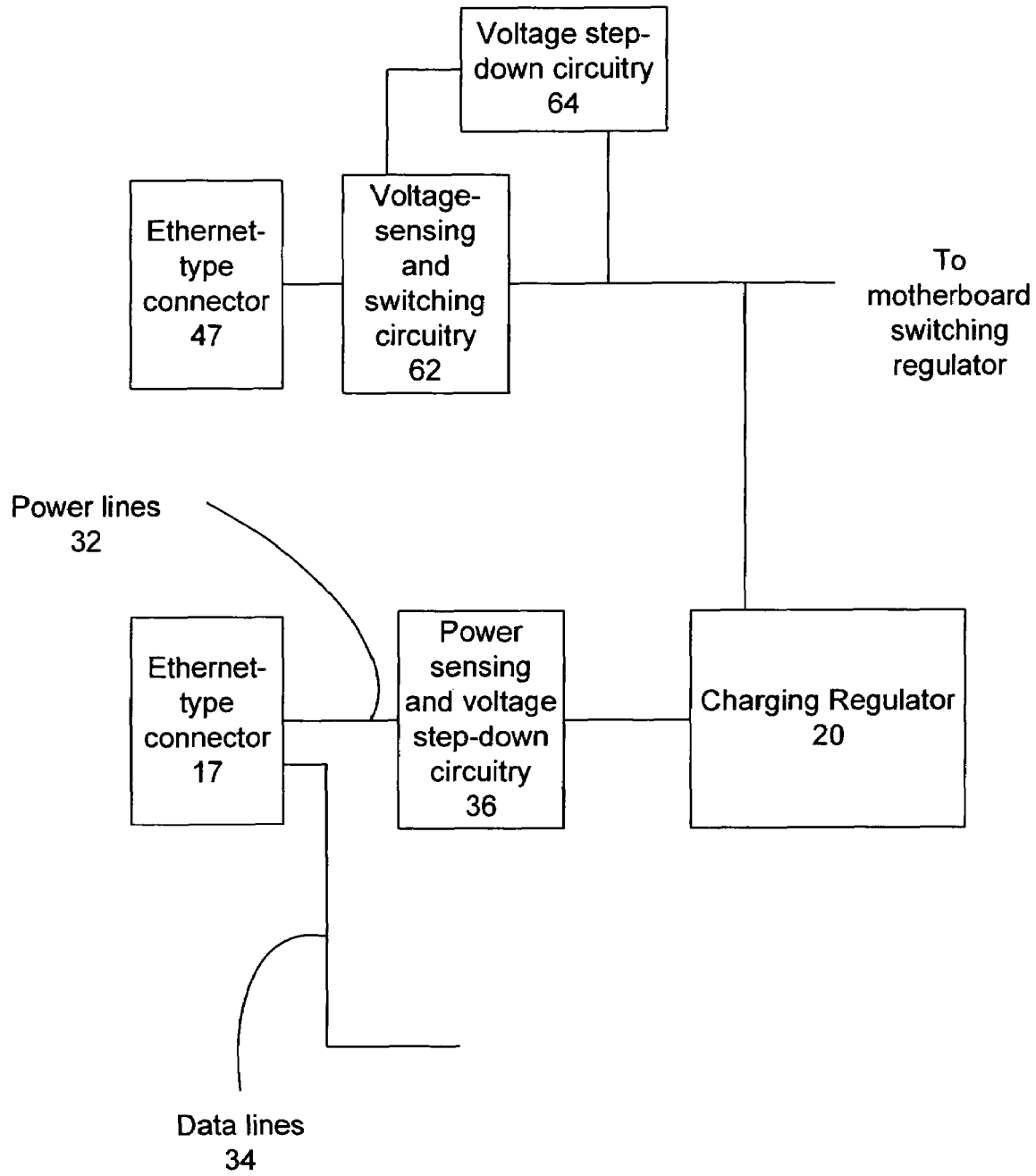
FIG. 6 depicts a portion of the electrical power system of FIG. 5 in greater detail in accordance with an embodiment of the present invention.

FIG. 6 depicts a portion of the electrical power system of FIG. 5 in greater detail in accordance with an embodiment of the present invention.

As depicted in FIG. 6, the first Ethernet connector 17 is configured to connect to both power lines 32 and data lines 34 within the notebook computer 40. In a particular embodiment, the power lines 32 connect to the battery charging regulator 20 by way of power sensing and voltage step-down circuitry 36. The power sensing circuitry is configured to sense whether or not the Ethernet connection provides power (in addition to or instead of data communications). If the power sensing circuitry determines power is not being provided, then the power lines may be kept disconnected from the charging regulator 20. The voltage step-down circuitry is configured to reduce the higher voltage level (for example, 50 volts) supplied by the Ethernet connection to a lower voltage level (for example, 15 volts) for the input to the charging regulator 20. Depending on the particular implementation, the power sensing and/or voltage step-down circuitry may be optional. In addition, signature circuitry may be included in the system so as to send a "signature" to the network to let the network know that the laptop computer can receive power via the network connection and also how much power is wanted-by the laptop computer.

As further depicted in FIG. 6, the second Ethernet-type connector 47 is configured to connect to the charging regulator 20 by way of voltage sensing and switching circuitry 62 and voltage step-down circuitry 64. The voltage-sensing circuitry is configured to sense or determine whether power is being supplied at a higher voltage level (for example, at 50 volts DC from a network) that needs to be stepped-down, or at a lower voltage level (for example, at 15 volts DC from a special power adaptor 49) that does not need to be stepped down. If the voltage supplied needs stepping-down, then the power may be switched by the switching circuitry to go through the voltage step-down circuitry 64. Otherwise, If the voltage supplied does not need stepping-down, then the power may be switched by the switching circuitry to bypass the step-down circuitry 64 and go directly to the charging regulator 20 (and also to the motherboard switching regulator of the laptop 40). Depending on the particular implementation, the above-discussed additional circuitry may be optional.

In an alternate embodiment, a same or similar voltage level is provided by the special power adaptor 49 as the voltage level provided by a network port (for example, approximately 50 volts). In this embodiment, the voltage-sensing and switching circuitry 62 is not needed. Instead, the voltage step-down circuitry 64 may be configured between the second Ethernet-type connector 47 and charging regulator 20 (without the voltage-sensing and switching circuitry 62).

Figure 7:
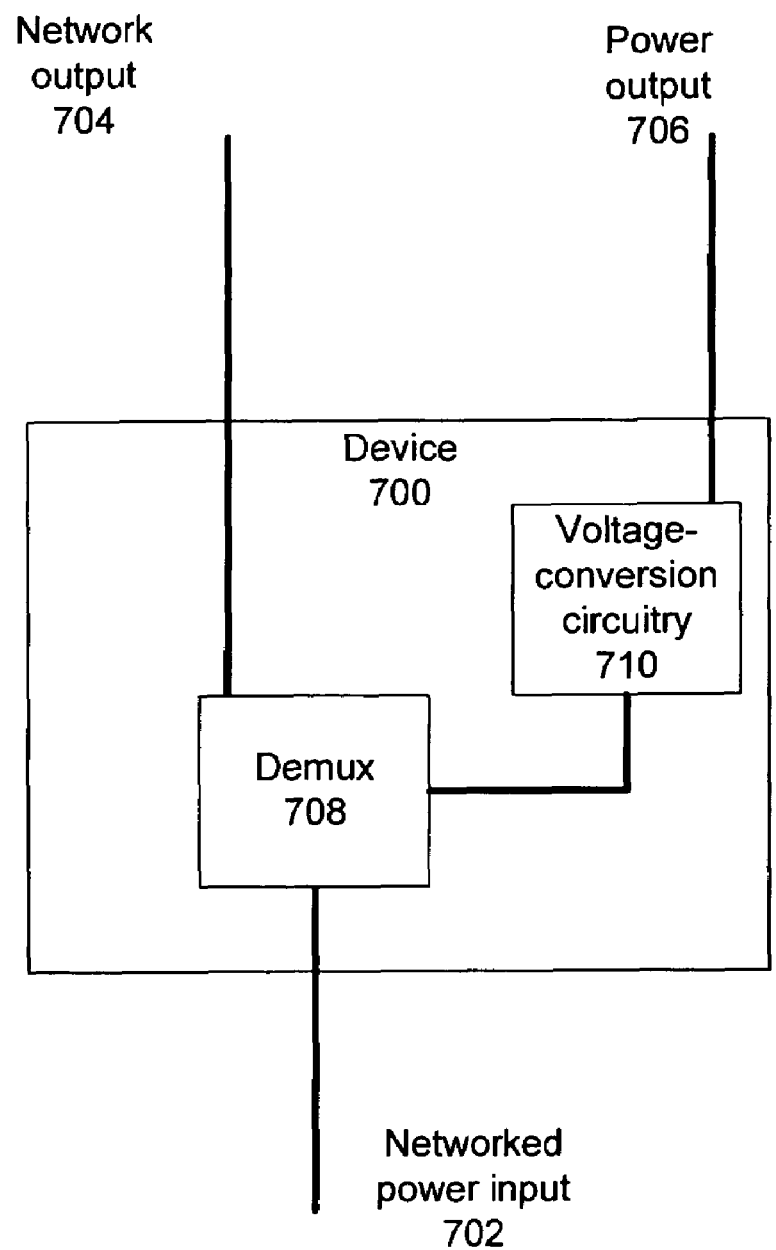
FIG. 7 depicts a networked power demultiplexer device in accordance with an embodiment of the present invention.

FIG. 7 depicts a networked power demultiplexer device 700 in accordance with an embodiment of the invention. The networked power demultiplexer device 700 includes an input 702 configured to connect to networked power. As such, the input 702 may receive both network signals and power. The device 700 further includes a first output 704 configured to provide the network signals to a conventional network port of a portable computer system and a second output 706 configured to provide DC power at a predetermined voltage level to a conventional DC power input of the portable computer system. The device 700 includes demultiplexer circuitry 708 configured to direct the network signals from the input 702 to the first output 704 and to direct the power from the input 702 to the second output 706. In addition, the adaptor device 700 may include voltage-conversion circuitry 710 configured to convert the DC power input to a pre-determined voltage level that is compatible with the power input of the portable computing device. Such a networked power demultiplexer device 700 is advantageously backward-compatible with existing laptop computers.

In one embodiment of the invention, a laptop computer is configured to receive external power (from one or more connections to a network supplying power) that is insufficient to fully power the laptop computer (which may require, for example, 80 watts to fully power). Although the external power received (for example, 15 watts per network connection) is insufficient to fully power the laptop computer, the external power is utilized to provide some recharging of the battery 30 such that the time period that the battery 30 may power the laptop computer is extended. For example, if a battery 30 normally would provide 3 hours of laptop operation, this method may enable the operation time to be advantageously extended to 4 hours, for example. Furthermore, if the laptop computer is idle or sleeping or hibernating or powered off, then the laptop computer could charge. For example, the laptop device may be left plugged into the network over night so that it may be fully charged the next morning.

In an embodiment of the invention, the power delivered by a network may be compatible with IEEE 802.3af (sometimes referred to as "Power over Ethernet" or PoE). The Ethernet cable may comprise, for example, Category-5 or other cable, and the Ethernet-type connector may comprise an RJ45 or other connector.

Although the above discussion focuses on recharging a laptop computer, alternate embodiments of the invention may involve adaptation of the invention so as to recharge a tablet or palmtop computer, or even personal digital assistant (PDA) devices.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A laptop computer system including a display casing, having display circuitry and a display screen, and a main computer casing coupled to the display casing, wherein the main computer casing comprises:

a battery power source coupled to a motherboard switching regulator;

a charging regulator coupled to the battery power source and configured to recharge the battery power source;

a first Ethernet-type connector having connections for both power and network data, said connections for power being coupled to the motherboard switching and charging regulators and configured to provide power thereto;

power-sensing circuitry coupled to the first Ethernet-type connector and configured to detect whether DC (direct current) power is received from said first Ethernet-type connector;

voltage step-down circuitry between the first Ethernet-type connector and the charging regulator, wherein the voltage step-down circuitry is configured to reduce a voltage level of said DC power received from approximately 50 volts to 15 volts or less; and a second Ethernet-type connector with power lines coupled to the charging regulator and configured to provide power thereto, wherein the second Ethernet-type connector is only configured to provide power and not for data communcations.

2. The laptop computer of claim 1, wherein the power provided by way of the first Ethernet-type connector is insufficient for full operation of the laptop computer and so is used to extend an operating time of the laptop computer running on battery power, while the power provided by the second Ethernet-type connector is sufficient for full operation of the laptop computer.

3. A portable computer system comprising:
a battery power source coupled to a motherboard switching regulator;
a charging regulator coupled to the battery power source and configured to recharge the battery power source;
a first Ethernet-type connector having both network data and power lines, said power lines being coupled to the charging regulator and configured to provide power thereto;
a second Ethernet-type connector coupled to both the motherboard switching regulator and to the charging regulator and configured to provide power thereto; and
a power adaptor configured to receive AC power and to output DC power via an Ethernet-type output connector which is configured to be inserted into said second Ethernet-type connector,wherein the first Ethernet-type connector is configured to provide both network communications and power, and wherein the second Ethernet-type connector is configured to provide power and not network communications.

4. The portable computer system of claim 3, further comprising:
power-sensing circuitry coupled to the first Ethernet-type connector and configured to detect power provided by way of a pair of lines from the first Ethernet-type connector.

5. The portable computer system of claim 4, further comprising:
voltage step-down circuitry configured between the first Ethernet-type connector and the charging regulator and configured to lower a DC voltage level of the power provided therefrom.

6. The portable computer system of claim 5, wherein the DC voltage level of power provided from the first Ethernet-type connector (prior to lowering) is approximately 50 volts.

7. The portable computer system of claim 3, further comprising:
voltage step-down circuitry configured between the second Ethernet-type connector and the charging regulator and configured to lower a DC voltage level of the power provided therefrom.

8. The portable computer system of claim 7, wherein the DC voltage level of power provided from the second Ethernet-type connector (prior to lowering) is approximately 50 volts.

9. The portable computer of claim 7, further comprising:
voltage-sensing circuitry coupled to the second Ethernet-type connector and configured to detect a voltage level provided by a pair of lines from the second Ethernet-type connector; and
switching circuitry configured to switch the power provided from the second Ethernet-type connector to the voltage step-down circuitry if a higher voltage level is detected by the voltage-sensing circuitry.

10. The portable computer of claim 3, wherein the power provided by way of the first Ethernet-type connector is insufficient for full operation of the laptop computer and so is used to extend an operating time of the laptop computer running on battery power.

11. The portable computer of claim 10, wherein the power provided by the second Ethernet-type connector is sufficient for full operation of the laptop computer if a power adaptor is connected to the second Ethernet-type connector, and the power provided by the second Ethernet-type connector is insufficient for full operation of the laptop computer if a network is connected to the second Ethernet-type connector.

* * * * *

UNITED STATES PATENT AND TRADEMARK OFFICE
CERTIFICATE OF CORRECTION

PATENT NO. : 7,424,626 B2  
APPLICATION NO. : 10/833603  
DATED : September 9, 2008  
INVENTOR(S) : Craig A. Vanzante Page 1 of 1

It is certified that error appears in the above-identified patent and that said Letters Patent is hereby corrected as shown below:

In column 7, line 10, in Claim 1, delete "communcations" and insert -- communications --, therefor.

In column 7, line 33, in Claim 3, delete "connector,wherein" and insert -- connector, wherein --, therefor.

Signed and Sealed this

Seventh Day of July, 2009

JOHN DOLL  
*Acting Director of the United States Patent and Trademark Office*